May 11, 1926.

E. R. DAVIS

CALF WEANER

Filed Oct. 23, 1925

1,584,437

Inventor

E. R. Davis,

By

Attorney

Patented May 11, 1926.

1,584,437

UNITED STATES PATENT OFFICE.

ELISHA R. DAVIS, OF HAZARD, NEBRASKA.

CALF WEANER.

Application filed October 23, 1925. Serial No. 64,366.

My invention relates to calf weaners.

One object is to provide a light, durable, inexpensive and efficient calf weaner and which may be readily applied or removed from the animal.

Another object resides in the provision of a weaner for animals which is so constructed as to provide for comfort of the animal and yet prevent it from sucking without preventing it from grazing.

With these and other objects in view, the invention consists in the construction and novel combination and arrangement of parts hereinafter fully described, illustrated in the accompanying drawings and pointed out in the claims hereto appended, it being understood that various changes in the form, proportion and minor details of construction, within the scope of the claims, may be resorted to without departing from the spirit or sacrificing any of the advantages of the invention.

Figure 1:
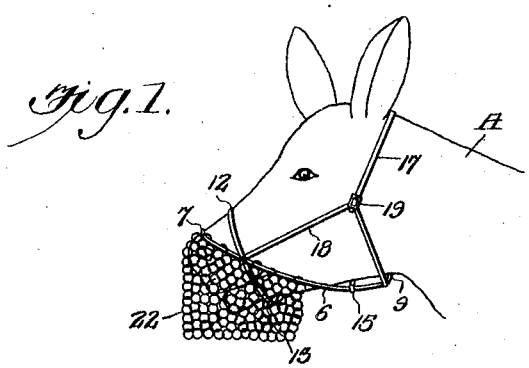
Figure 1 is a side elevation, showing the invention applied.
Figure 2:
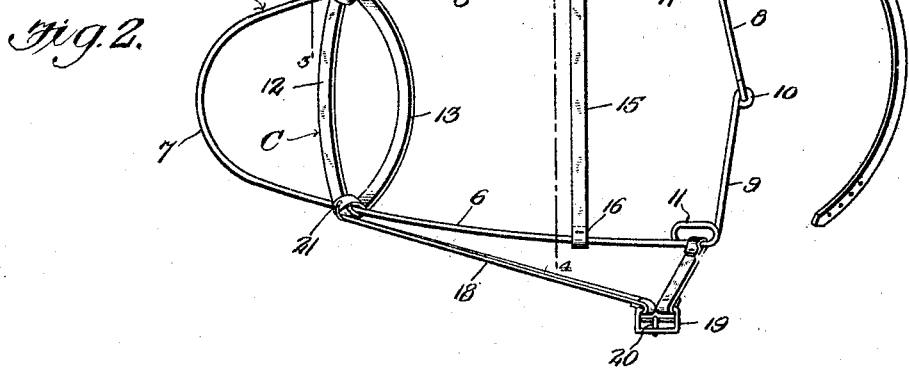
Fig. 2 is a top plan view of the invention unapplied.
Figure 4:
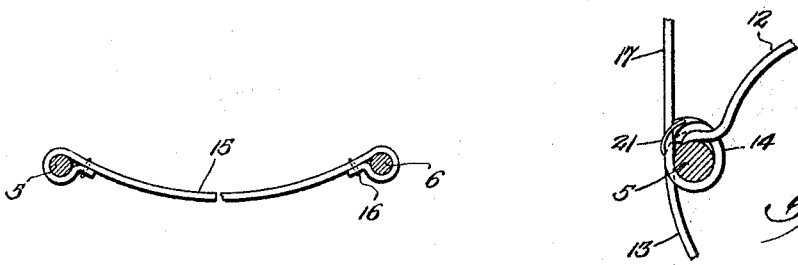
Fig. 4 is a similar view on the line 4—4 of Fig. 2.
Figure 4:
Figure 3:
Fig. 3 is a transverse sectional view on the line 3—3 of Fig. 2.

Referring now more particularly to the accompanying drawings, the reference character A indicates the head of the animal and B indicates, generally, a frame including side bars 5 and 6 connected at their front ends by the bight portions 7 and at their rear ends directed inwardly toward each other, as at 8 and 9, respectively, and hooked together as indicated at 10. This frame may be composed of soft wire or other suitable light material. Irrespective of the nature of the material of which the frame is composed, eyes 11 are formed or disposed at the rear ends of the side bars for a purpose presently explained.

A strap C formed to provide an upper nose engaging portion 12 and a lower mouth engaging portion 13 is slidably mounted on the side bars by means of suitable devices 14.

A strap 15 is mounted on the side bars near the rear or inner ends thereof and slidable for adjustment thereon by means of suitable devices 16.

To effectively support the frame, I employ a suitable adjustable head gear indicated, generally, by the character D and which consists of a head strap composed of two sections 17 and 18, the section 17 being adapted to extend over the back of the head of the animal and connected to the section 18 at the side of the head of the animal by a buckle 19 provided with a bill 20 over which may fit the meeting ends of both of said sections. The buckle 19 permits adjustment of the head gear. The forward ends of each strap section 17—18 is folded inwardly over the respective side bar 5—6 and back onto the nose-engaging portion 12 of the strap C and secured thereto by means of a suitable fastening 21 and thereby movable with said strap C along the side bars 5—6 of the frame A, and whereby adjustment of the device on the animal is readily afforded.

To wean the animal from its mother and yet permit it to graze, I suspend wires or other fabric 22 from the side bars 5 and 6 and the bight portion 7 thereof. As shown, the material 22 is composed of wire in the nature of interlaced rings forming a mesh with the uppermost rings slidable on the bight portion 7 and side bars 5 and 6, the nose and mouth strap C preventing the mesh from sliding beyond operative position on the frame.

What is claimed is:—

1. A weaner comprising a frame including side bars having their rear ends directed inwardly toward each other and hooked together, a strap connected to the side bars to engage the underside of the animal's neck, an adjustable headgear connected to the frame and adapted to fit the head and face of the animal to support the frame in position on the animal, and fabric material suspended from the frame to lie over the front and sides of the mouth of the animal.

2. A weaner comprising a frame including side bars connected together at their ends and adjacent their rear ends having eyes, a nose and mouth strap slidable on the bars, a strap to engage the underside of the neck of the animal, a head gear connected to said nose and mouth strap and to said eyes of the side bars from along the side bars, and material forming a guard secured to the frame.

3. A weaner comprising a frame extending at its front end from above the nose of the animal downwardly and rearwardly to a point under the neck of the animal and at its rear end terminating under the neck of the animal, means for supporting the frame in such position, and mesh material carried by the frame.

In testimony whereof I have hereunto set my hand.

ELISHA R. DAVIS.